Patented Dec. 12, 1950

2,533,994

UNITED STATES PATENT OFFICE 2,533,994

THERMOSETTING ADHESIVE COMPOSITION AND LAMINATE

Henry M. Cadot, Greenville, Del., assignor to E. I. du Pont de Nemours & Company, Wilmington, Del., a corporation of Delaware No Drawing. Application December 30, 1944, Serial No. 570,753

2 Claims. (Cl. 154—45.9)

This invention relates to improvements in resinous compositions, and more particularly to an improved adhesive composition adapted for use in the manufacture of laminated materials.

An object of this invention is to provide an adhesive composition which may be applied in the absence of appreciable amounts of solvent in the manufacture of high quality hot-pressed laminated materials, particularly plywood. Another object is to provide hot-pressed plywood which has excellent shear strength even after prolonged contact with boiling water. Yet another object is to provide improved fluid compositions which yield cured resins upon the application of heat.

These and other objects are accomplished in accordance with the invention by providing a composition containing as its essential ingredients melamine, formaldehyde and an alkoxyalkoxyalkyl carbamate. It has been discovered, in accordance with this invention, that a melamine-formaldehyde condensation product modified by reaction with an alkoxyalkoxyalkyl carbamate, such as methoxymethoxyethyl carbamate, may be employed as a plywood adhesive in the manufacture of hot-pressed plywood which meets United States Army and Navy requirements as set forth in Specification AN-NN-P-511b for aircraft plywood.

In one specific embodiment, this invention may be practiced by treating about 1 mol of melamine with about 3 to 4 mols of aqueous formaldehyde, and thereafter heating the resulting aqueous solution of condensation product with 1 mol of methoxymethoxyethyl carbamate at a temperature of about 50° to 100° C., and removing the water contained in the mixture by vacuum distillation at relatively low temperature. In this manner a clear viscous fluid is obtained, which, when heated to a temperature of about 80° to 150° C., is converted to an insoluble resin. In standard tests plywood, prepared by coating veneers with this viscous fluid composition and pressing the coated veneers together at a temperature of 80° to 150° C., preferably about 100° to about 120° C., under a pressure of about 30 to 300 pounds per square inch, has a dry and wet strength well above the minimum (dry-380 pounds per square inch; wet-290 pounds per square inch) set by Specification AN-NN-P-511b.

This invention is illustrated further by means of the following examples.

*Example 1.*—A mixture containing 34.6 parts of melamine, 66.5 parts of formalin (37% formaldehyde adjusted to a pH of 7 with triethanolamine) was heated for ½ hour at a temperature of 80° C. To the resulting aqueous solution of melamine-formaldehyde condensation product 40.8 parts of methoxymethoxyethyl carbamate was added, and water was removed from the mixture by distillation under diminished pressure until a viscous fluid residue containing about 6% water was obtained. This fluid was applied to the surface of birch veneers at the rate of 30 pounds per thousand square feet of glue line area. The coated veneers were laminated by heating at a temperature of 80° to 105° C. under pressure of 125 pounds per square inch for 15 minutes. The resulting plywood had a dry shear strength of 450 pounds per square inch and a wet shear strength (after being subjected to the action of boiling water for 3 hours) of 310 pounds per square inch.

*Example 2.*—Example 1 was repeated except that the removal of water from the melamine-formaldehyde-methoxymethoxyethyl carbamate reaction product was continued at diminished pressure until a residue which was substantially free of water was obtained. The plywood obtained by heating the coated veneers at 100° to 108° C. for 15 minutes under a pressure of 125 pounds per square inch had a dry shear strength of 520 pounds per square inch and a wet shear strength of 435 pounds per square inch.

*Example 3.*—A mixture containing 31.9 parts of melamine and 82.1 parts of formaldehyde (as 37% formaldehyde adjusted to a pH of 7 with triethanolamine) was heated at a temperature of 60° to 90° C. for ½ hour. Another mixture containing 37.7 parts of methoxymethoxyethyl carbamate and 61.6 parts of formalin was heated at 50° to 90° C. for ½ hour. These two compositions were mixed at room temperature and water was removed from the resulting mixture by distillation at diminished pressure in a vacuum still, the head temperature of which was 30° C. A clear anhydrous viscous fluid residue was thus obtained. This material was applied to the surfaces of birch veneers at the rate of 30 pounds per thousand square feet of glue line area. Plywood made from these coated veneers by laminating at a temperature of 100° to 110° C. under a pressure of 125 pounds per square inch for 15 minutes had a dry shear strength of 425 pounds per square inch, and a wet shear strength of 385 pounds per square inch.

The methoxymethoxyethyl carbamate used in the foregoing examples was prepared by heating urea with methoxymethoxyethanol. It had a boiling point of 117° to 119° C./2 mm. Methoxymethoxyethyl carbamate is represented by the formula, NH₂COOCH₂CH₂OCH₂OCH₃.

One of the advantages of the adhesives of this invention is that the are generally fluid, and may be applied in the absence of solvents or accelerators. Since solvents are unnecessary, it is obvious that such adhesives have the advantage of small shipping bulk, and freedom from change due to solvent evaporation, either before or after application.

The improvements in resinous compositions disclosed herein have been described with particular reference to the usefulness of the methoxymethoxyalkyl carbamate-modified melamine-formaldehyde reaction products as adhesives for plywood. The compositions of the invention are likewise very valuable in numerous other practical applications, such as in the manufacture of impregnated cloth, paper, wood, etc., molding compositions, insulation and the like. In general these resins have utility where a resin is desired which can be obtained in fluid form, and cured to yield a solid product having good resistance to the effects of water.

The above examples are illustrative only, and numerous modifications of the invention will occur to those who are skilled in the art. Accordingly, I do not limit myself except as set forth in the following claims.

I claim:
1. Hot-pressed plywood glued with an adhesive comprising a methoxymethoxyethyl carbamate-modified melamine-formaldehyde condensation product.
2. A thermosetting adhesive composition consisting essentially of a viscous, fluid methoxymethoxyethyl carbamate - modified melamine-formaldehyde reaction product composed of about 1 mol of melamine, 3 to 4 mols of formaldehyde, and 1 mol of methoxymethoxyethyl carbamate.

HENRY M. CADOT.

REFERENCES CITED

The following references are of record in the file of this patent:

UNITED STATES PATENTS

| Number | Name | Date |
| --- | --- | --- |
| 2,226,202 | Hill | Dec. 24, 1940 |
| 2,263,447 | Shepard | Nov. 18, 1941 |
| 2,271,744 | Nevin | Feb. 3, 1942 |
| 2,320,817 | D'Alelio | June 1, 1943 |
| 2,322,887 | Schwartz | June 29, 1943 |

FOREIGN PATENTS

| Number | Country | Date |
| --- | --- | --- |
| 876,390 | France | Aug. 3, 1942 |
| 887,510 | France | Aug. 16, 1943 |